(12) United States Patent
Dubey et al.

(10) Patent No.: US 9,335,914 B2
(45) Date of Patent: May 10, 2016

(54) SELECTING AND SERVING CONTENT BASED ON SCROLL PATTERN RECOGNITION

(71) Applicant: Yahoo! Inc., Sunnyvale, CA (US)

(72) Inventors: Sourabh Santoshkumar Dubey, Bangalore (IN); Vineeth Nair, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 117 days.

(21) Appl. No.: 13/886,581

(22) Filed: May 3, 2013

(65) Prior Publication Data

US 2014/0331169 A1   Nov. 6, 2014

(51) Int. Cl.
```
G06F 3/048      (2013.01)
G06F 3/0485     (2013.01)
G06F 3/14       (2006.01)
G06F 3/0484     (2013.01)
G06Q 30/02      (2012.01)
```
(52) U.S. Cl.
CPC .......... *G06F 3/0485* (2013.01); *G06F 3/04842* (2013.01); *G06F 3/14* (2013.01); *G06Q 30/02* (2013.01)

(58) Field of Classification Search
CPC ................... G06F 2203/04806; G06F 3/0488; G06F 17/30017; G06F 17/30289
See application file for complete search history.

(56) References Cited

U.S. PATENT DOCUMENTS

| | | | |
|---|---|---|---|
| 2008/0072132 A1* | 3/2008 | Moraveji et al. | 715/203 |
| 2008/0092078 A1* | 4/2008 | Takeshima et al. | 715/786 |
| 2012/0290971 A1* | 11/2012 | Takami | 715/784 |

* cited by examiner

*Primary Examiner* — William Bashore
*Assistant Examiner* — Rayeez Chowdhury
(74) *Attorney, Agent, or Firm* — Hickman Palermo Becker Bingham LLP

(57) ABSTRACT

A method and apparatus for scroll pattern recognition is provided. First content is provided to an application with a scrolling interface and a display window. The application is configured to display a portion of the first content to a user based on a current display position, where the scrolling interface is configured to change the current display position based on input from the user. User interaction data that includes scroll data is obtained. The occurrence of an actionable event based on the user interaction data is determined. Second content is provided to the application based on the actionable event.

20 Claims, 10 Drawing Sheets

SELECTING AND SERVING CONTENT BASED ON SCROLL PATTERN RECOGNITION

FIELD OF THE INVENTION

The present invention relates to computer systems. More specifically, the present invention relates to selecting and serving content based on user interaction data.

BACKGROUND

An increasing amount of digital content is generated and made available for consumption, such as for viewing on a computing device. For example, online content is regularly published for consumption by users over the Internet. However, limited data is available to track content consumption information.

Content publishers often monetize the publication of content by providing advertising to the user. Targeted advertising is often used to increase the effectiveness of the advertisement. However, advertisement may increase the risk of the user becoming disengaged with the content. Users may also become disengaged with content for reasons other than advertisement.

Publishers often use basic metrics such as page views and time spent to estimate the engagement level of its audience. Publishers may also use off-line studies and surveys. However, once the content is served to a specific user, the publisher has little control over the specific user's level of engagement with the content provided.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques, systems, methods and apparatuses are provided for selecting and serving content based on scroll pattern recognition. The claims are hereby incorporated into this summary.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

Systems and methods are provided for content selection and serving based on scroll pattern recognition. As a user is viewing a document, user interaction data is obtained. The user interaction data includes scroll data. Based on the user's interaction with the displayed document, customized content is selected and served to the user. The user's interaction with the displayed document may provide information about the user's state of mind as the user views the content, such as the user's reaction, level of engagement, preferences and/or intent.

Figure 1:
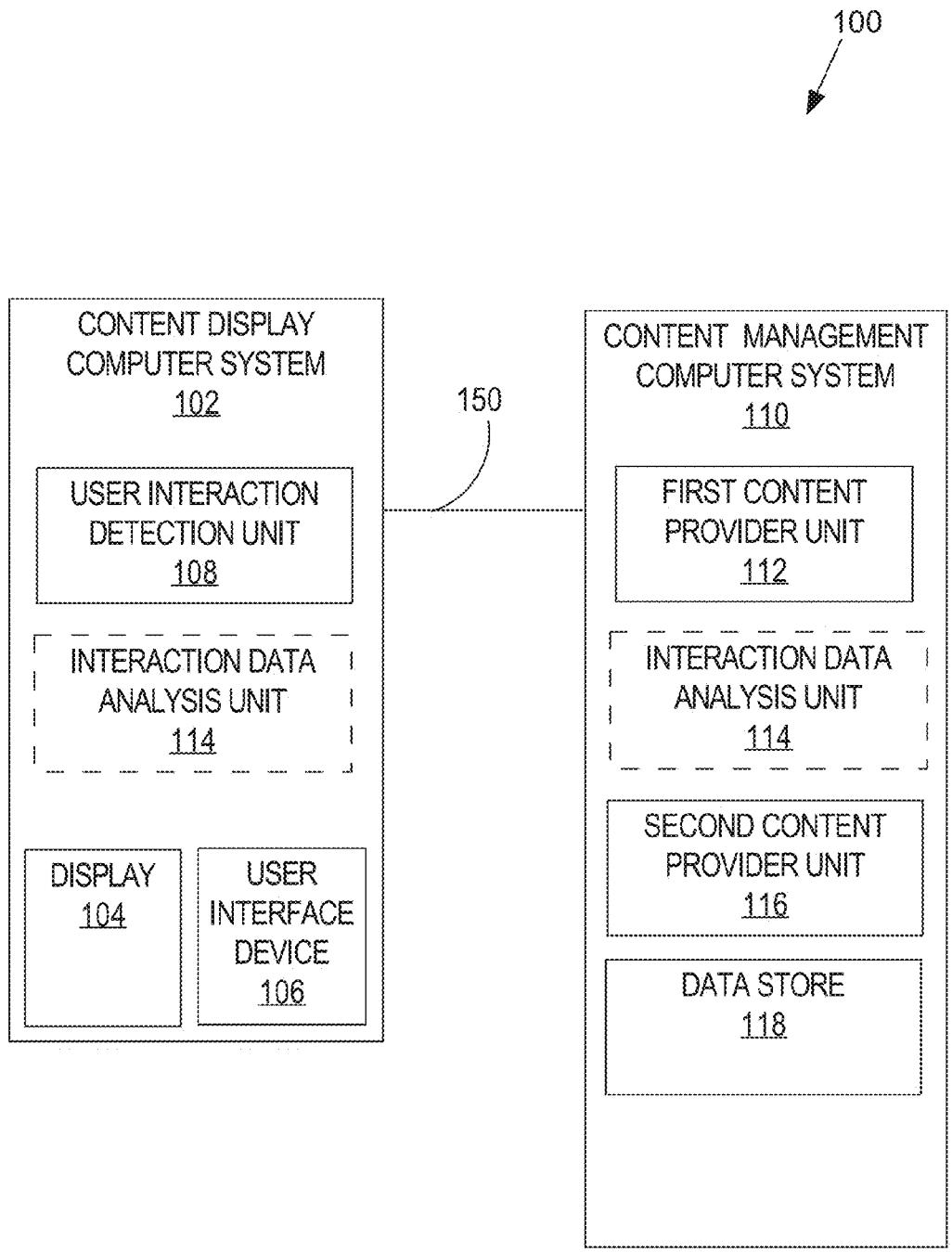
FIG. 1 illustrates an embodiment of a system configured to implement content selection and serving based on user interaction data.

FIG. 1 illustrates an embodiment of a system configured to implement content selection and serving based on user interaction data. Content selection system 100 includes content display computer system 102. Content display computer system 102 may be any computing device capable of displaying a document on display 104. In one embodiment, the document is a web resource, such as a web document.

The document may be displayed by any software application executing on content display computer system 102. In one embodiment, the software application is configured to display web documents. The software application may be a standard Internet browser or may be any other application that implements browser features for displaying a web document. In one embodiment, content display computer system 102 is a mobile device and the software application is a mobile application.

Content display computer system 102 includes and/or is coupled with at least one user interface device 106. User interface device 106 may include one or more devices configured to allow a user to interact with content display computer system 102, such as a mouse, a keyboard, a keypad, a wheel device, a ball device, a track device, a joystick, a stylus, a touch screen including but not limited to resistive and/or capacitive touch screens, any other touch interface, or any other device that allows a user to interact with content display computer system 102.

Content display computer system 102 includes and/or is coupled with display 104. In one embodiment, a portion of the document is displayed on display 104 in a display window with a scrolling interface. The displayed portion of the document is associated with a current display position in the document. The scrolling interface may be any navigation interface capable of navigating the document by changing the current display position. In one embodiment, display and user interface device 106 are coupled.

The scrolling interface is configured to change the current display position based on user interaction via user interface device 106. The user interaction data may include display positions in the document and corresponding time information. For example, if a user navigates to a specific display position in the document at $t_1$ and stays there until $t_2$, the user interaction data may include the specific display position and any corresponding time information, including but not limited to a start time $t_1$, an end time $t_2$, a duration $t_2-t_1$, and an order in which the specific display position was displayed with respect to other display positions within the document.

In one embodiment, the current display position is a position in two dimensions (x, y). Alternatively or in addition, content display computer system 102 may be configured to display at least one document with a constrained dimension such that navigation is limited to the other dimension. For example, when the document has a constrained height such that the entire height of the document is visible in the display window, navigation is limited to horizontal navigation. Likewise, when the document has a constrained width such that the entire width of the document is visible in the display window, navigation is limited to vertical navigation. For simplicity and without limiting the disclosure to one-dimensional navigation, embodiments discussed in FIGS. 2, 3, 6A-D, 7 and 9 are discussed with respect to one-dimensional navigation.

Content display computer system 102 further includes user interaction detection unit 108. User interaction detection unit 108 is configured to obtain user interaction data based on user input from user interface device 106. The user interaction data may include any user input from interface device 106, including scroll data.

In one embodiment, content selection system 100 further includes content management computer system 110. Content management computer system 110 is configured to communicate with content display computer system 102 to implement content selection based on user interaction data.

Content management computer system 110 includes first content provider unit 112. In one embodiment, first content provider unit 112 is configured to provide content, such as one or more documents, including web documents and other web resources. In one embodiment, first content provider unit 112 is configured to provide a stream of web content. The stream of web content may include a set of predetermined web objects in a set order. Alternatively or in addition, the stream of web content may be a dynamically selected stream of web objects.

First content provider unit 112 may directly provide the content over network 150, or alternatively or in addition, may direct content display computer system 102 to obtain the content over network 150. Network 150 may include one or more communication paths, such as but not limited to Local Area Networks (LAN), Wide Area Networks (WAN), Wireless networks, optical networks, distributed networks, the Internet, telecommunication networks, any other any type of communication network or any combination thereof.

Content selection system 100 further includes interaction data analysis unit 114. One or more interaction analysis units 114 may reside on content display computer system 102 and/or content management computer system 110. Interaction data analysis unit 114 is configured to determine the occurrence of an actionable event based on the user interaction data, such as the scroll data.

An actionable event may be determined based on scroll pattern matching, a rate of one or more user interactions, a threshold level, or any other factor that may relate to an actionable event. In one embodiment, the actionable event is based on a user's likely state of mind based on the user interaction data. The user's interaction with the content displayed on display 104 may provide information about the user's state of mind as the user views the content, including but not limited to a reaction, a level of engagement, a content preference, and an intent. As a non-limiting example, FIGS. 6A-6D illustrate the following scroll patterns that may be detected in user interaction data:

random scroll pattern indicating that the user may be searching;
even scroll pattern indicating that the user may be engaged;
speed increase scroll pattern indicating that the user may be disengaged or becoming less engaged; and
media viewing scroll pattern indicating that the user is likely interested in visual media.

Content management computer system 110 includes second content provider unit 116. In one embodiment, second content provider unit 116 is configured to provide additional content that is customized based on the user interaction data collected for the content provided by first content provider unit 112. In one embodiment, the occurrence of an actionable event is determined based on the user interaction data. Second content provider unit 116 may the same as or integrated with first content provider unit 112. Alternatively or in addition, second content provider unit 116 may be separate from first contentment provider unit 112. For example, first content provider unit 112 and second content provider unit 116 may reside at the same or different addresses. In one embodiment, second content provider unit 116 includes at least one advertisement engine, recommendation engine, or any unit capable of providing additional content.

For example, if it is determined that the user is likely searching a document, a search interface may be displayed as the additional content. If it is determined that the user is likely engaged, an advertisement may be displayed as the additional content. If it is determined that the user is becoming disengaged, more engaging content and/or recommendations may be provided as the additional content. If it is determined that the user is interested in visual media, such as a slideshow, image library, video or other visual media, then other visual media may be displayed as the additional content.

Second content provider unit 116 may directly provide the additional content over network 150, or alternatively or in addition, may direct content display computer system 102 to obtain the additional content over network 150.

Content management computer system 110 may also include data store 118. Data store 118 may store at least one of: first content, such as content provided by content provider unit 112; second content, such as content provided by second content provider unit 116 based on user interaction data; keyed document information (as detailed in FIG. 7); aggregated user interaction data for one or more documents (as detailed in FIG. 9); and/or any other data that may be generated, stored or accessed by content management computer system 110.

Figure 2:
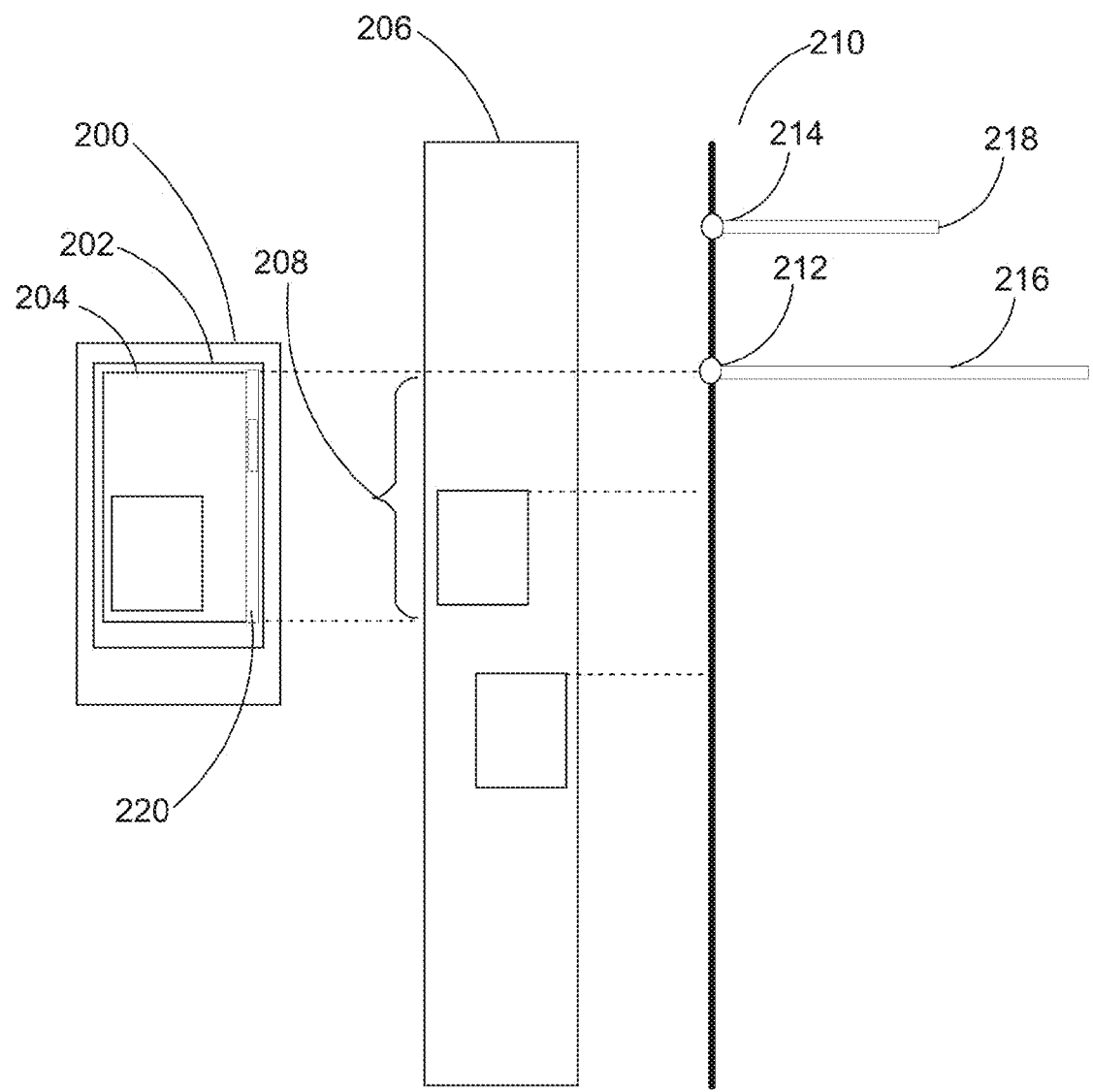
FIG. 2 illustrates an embodiment of user interaction data corresponding to a document displayed on a device.

FIG. 2 illustrates an embodiment of user interaction data corresponding to a document displayed on a device. Computing device 200 has a touch screen 202. Touch screen 202 functions as both a display and a user interface device. Computing device 200 is configured to display a portion 204 of document 206 to a user based on a current display position 212. Computing device 200 is also configured to display scrolling interface 220. Scrolling interface 220 is configured to change the current display position 208 based on input from the user that may be entered using a user interface device, such as touch screen 202.

User interaction data 210 includes user input from a user interface device, such as touch screen 202. User interaction data 210 includes scroll data 212-218. Scroll data 212-218 includes a specific display position and any corresponding time information, including but not limited to a start time $t_1$, an end time $t_2$, a duration $t_2-t_1$, and an order in which the specific display position was displayed with respect to other display positions within the document. A visual representation of duration 216-218 is shown at display positions 212-

214. The duration may be represented in any other format, including but not limited to the formats discussed with respect to FIG. 1 and FIG. 8.

Figures 3A, 3B:
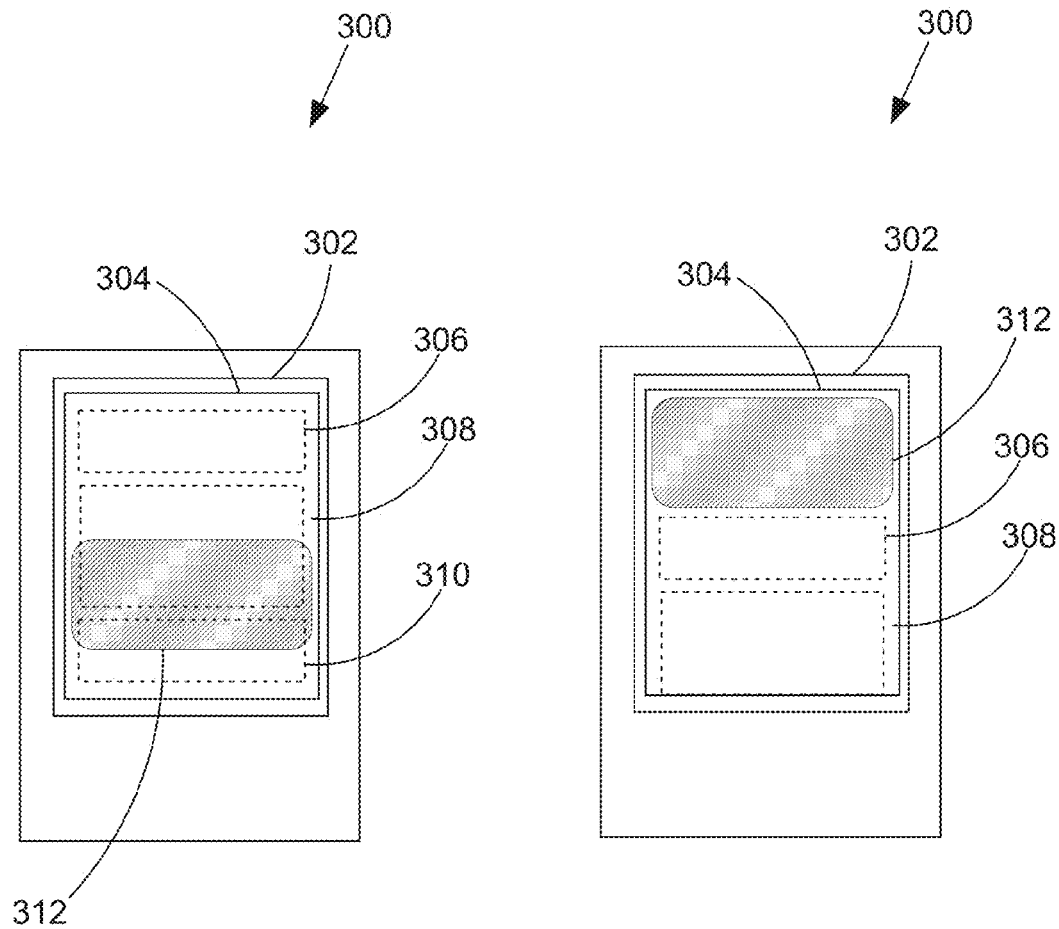
FIGS. 3A-3B illustrate embodiments of devices displaying dynamically selected content.

FIGS. 3A-3B illustrate embodiments of devices displaying dynamically selected content. The dynamically selected content is selected based on user interaction data, such as scroll data. In one embodiment, the dynamically selected content is selected after determining the occurrence of an actionable event based on at least the scroll data. The dynamically selected content may include one or more web objects, articles, recommendations, advertisements, search interfaces, other interfaces, slideshows, media libraries, videos, or any other content that may be selected based on user interaction data generated when a user is viewing content.

Computing device 300 includes display 302. First content 304 is displayed to a user on display 302, where first content 304 includes objects 306-310. In one embodiment, first content 304 is a web document, and objects 306-310 include at least one web object. Based on user interaction data generated when the user views first content 304, customized second content 312 is displayed to the user. As illustrated in FIG. 3A, second content 312 may be displayed over first content 304. Second content 312 may be opaque or may have some degree of transparency. As illustrated in FIG. 3B, second content 312 may be displayed by inserting second content 312 into first content 304. In one embodiment, second content 312 is inserted based on a current display position, including but not limited to any position currently viewable by the user on screen 302.

2. Functional Overview

Figure 4:
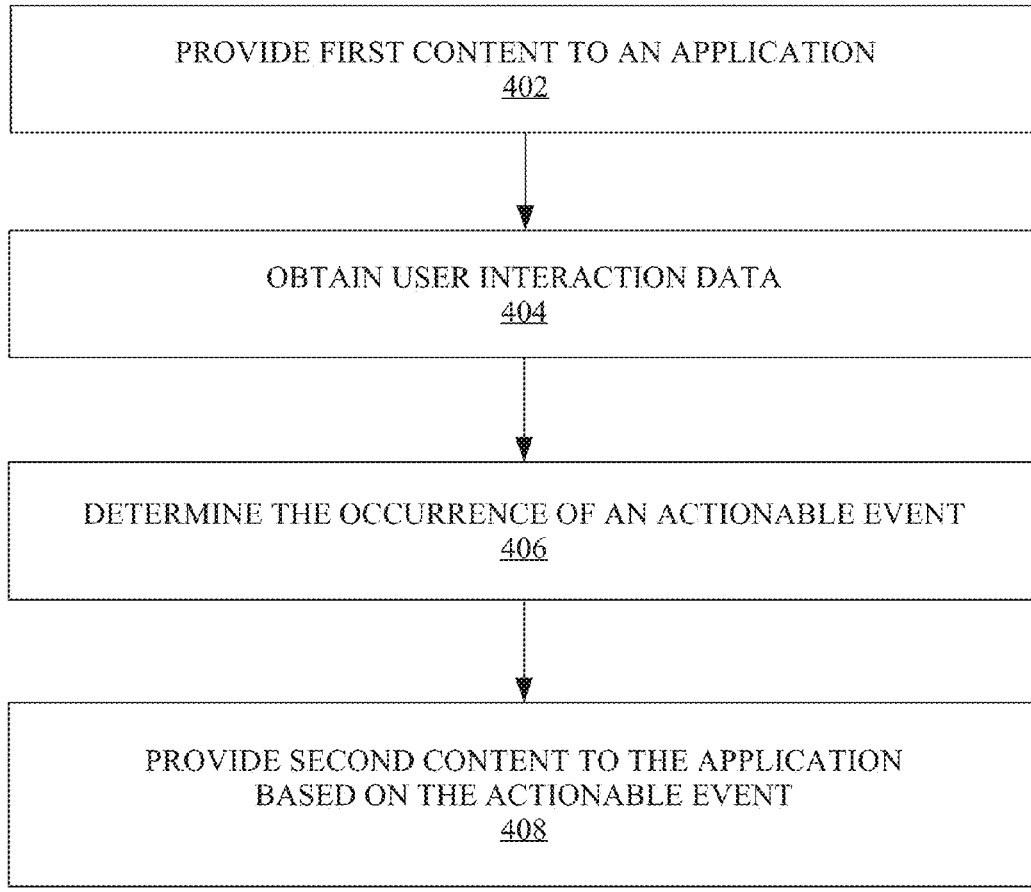
FIG. 4 illustrates an embodiment of a method for dynamically selecting content based on user interaction data.

FIG. 4 illustrates an embodiment of a method for dynamically selecting content based on user interaction data. Such a method may be performed by one or more computing devices, including a client device and/or a server device. For example, one or more steps of the method may be performed by computer system 1000.

At block 402, first content is provided to an application with a scrolling interface and a display window. The application is configured to display a portion of the first content to a user based on a current display position. The scrolling interface is configured to change the current display position based on input from the user. The first content may be a web resource, such as a web document. The first content may include at least one object, such as a web object.

At block 404, user interaction data is obtained. The user interaction data includes scroll data comprising a plurality of display positions and corresponding time information. The user interaction data may include other user input data related to the user's interaction with the first content.

At block 406, the occurrence of an actionable event is determined based on the user interaction data. An actionable event may be determined based on scroll pattern matching, a rate of one or more user interactions, a threshold level, or any other factor that relates to an actionable event. In one embodiment, the actionable event is based on a user's likely state of mind, as determined based on the user interaction data. In one embodiment, the detection of the actionable event triggers the selection of dynamically selected content that is customized for the user based on the user interaction data.

At block 408, second content is provided to the application based on the actionable event. In one embodiment, the second content includes one or more web objects, articles, recommendations, advertisements, search interfaces, other interfaces, slideshows, media libraries, videos, or any other content that may be selected based on an actionable event.

Figure 5:
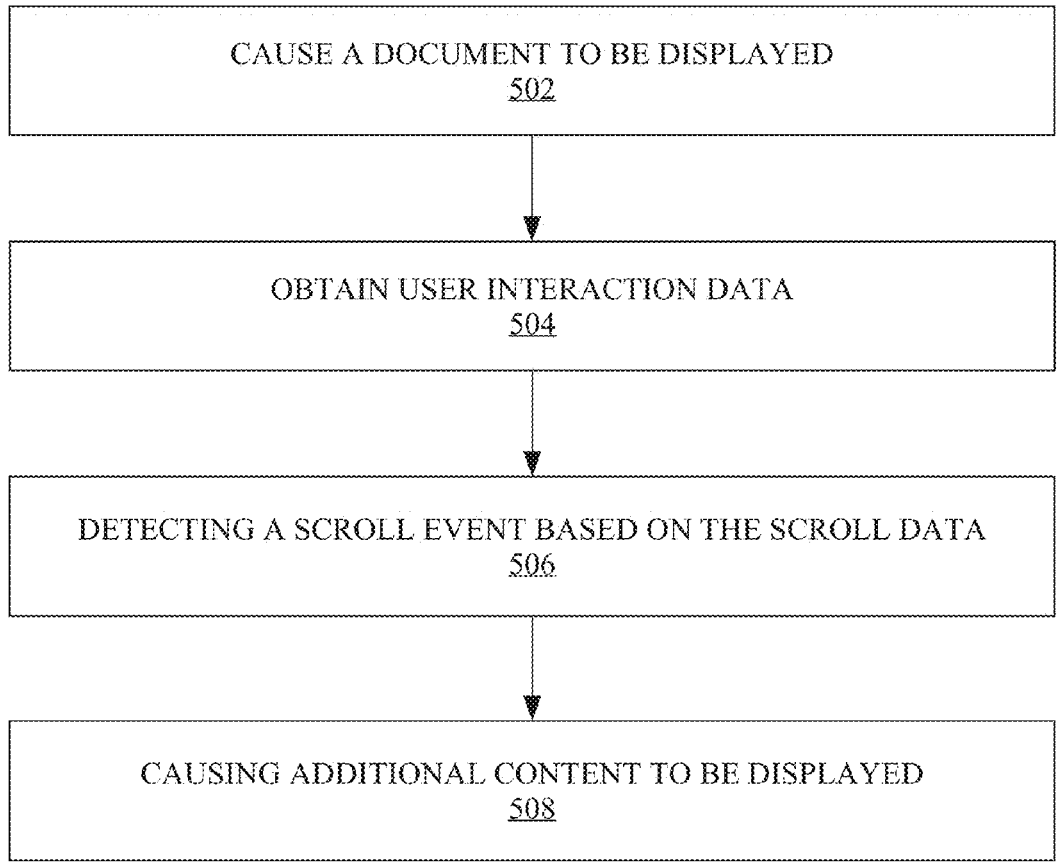
FIG. 5 illustrates an embodiment of a method for dynamically selecting content based on user interaction data.

FIG. 5 illustrates an embodiment of a method for dynamically selecting content based on user interaction data. Such a method may be performed by one or more computing devices, including a client device and/or a server device. For example, one or more steps of the method may be performed by computer system 1000.

At block 502, a document is caused to be displayed on a computing device. The document may be a web resource, such as a web document that includes at least one web object.

At block 504, user interaction data is obtained. The user interaction data includes scroll data comprising a plurality of display positions and corresponding time information. The user interaction data may include other user input data related to the user's interaction with the document.

At block 506, an actionable event is detected based on the user interaction data. An actionable event may be determined based on scroll pattern matching, a rate of one or more user interactions, a threshold level, or any other factor that relates to an actionable event. In one embodiment, the actionable event is based on a user's likely state of mind, as determined based on the user interaction data.

At block 508, additional content is caused to be displayed on the computing device. In one embodiment, the additional content includes one or more web objects, articles, recommendations, advertisements, search interfaces, other interfaces, slideshows, media libraries, videos, or any other content that may be selected based on an actionable event.

3. Example Scroll Patterns

Figure 6A:
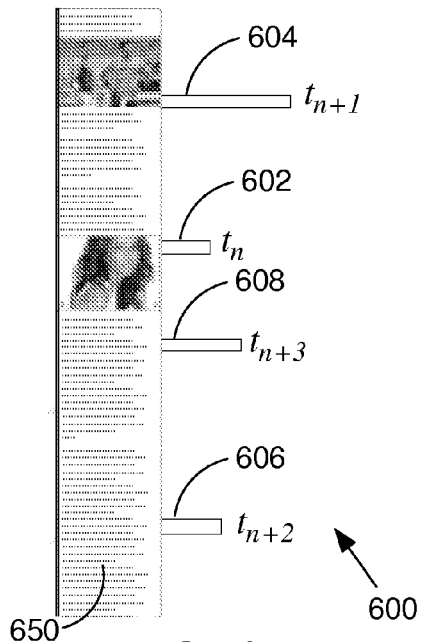
FIGS. 6A-6D illustrate embodiments of scroll patterns.

FIGS. 6A-6D illustrate embodiments of scroll patterns. FIG. 6A illustrates scroll data 600. Scroll data 600 indicates that the user has viewed document 650 at display positions 602-608 in the order 602 at $t_n$, 604 at $t_{n+1}$, 606 at $t_{n+2}$ and 608 at $t_{n+3}$, where duration is represented by length in the visual representation of scroll data 600. It may be determined from scroll data 600 that an actionable event has occurred based on the detection of a random scroll pattern in scroll data 600. The random scroll pattern may indicate that the user is searching within document 650. In one embodiment, when a random scroll pattern is detected, a search interface is displayed as the additional content.

Figure 6B:
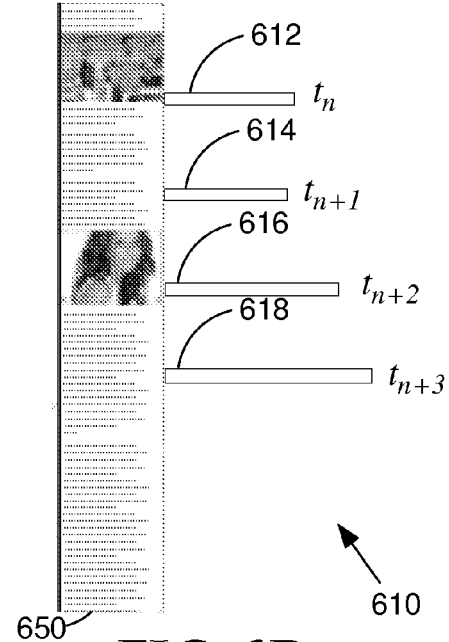

FIG. 6B illustrates scroll data 610. Scroll data 610 indicates that the user has viewed document 650 at display positions 612-618 in the order 612 at $t_n$, 614 at $t_{n+1}$, 616 at $t_{n+2}$ and 618 at $t_{n+3}$, where duration is represented by length in the visual representation of scroll data 610. It may be determined from scroll data 610 that an actionable event has occurred based on the detection of an even scroll pattern in scroll data 610. The even scroll pattern may indicate that the user is engaged with document 650.

The detection of an even scroll pattern may be based on a distribution of display positions 612-618, the duration the user views document 650 at display positions 612-618 (e.g., compared to a threshold duration), and/or any other factor that may indicate that the content and document 650 is being consumed by a user who is engaged. These factors may be compared with the user's historic user interaction data for other documents, as well as other users' historic user interaction data for the present document 650. In one embodiment, when an even scroll pattern is detected, a level of engagement is calculated based on these factors. The level of engagement may be used to provide advertisement content at an appropriate time that is unlikely to cause the user to disengage.

Figure 6C:
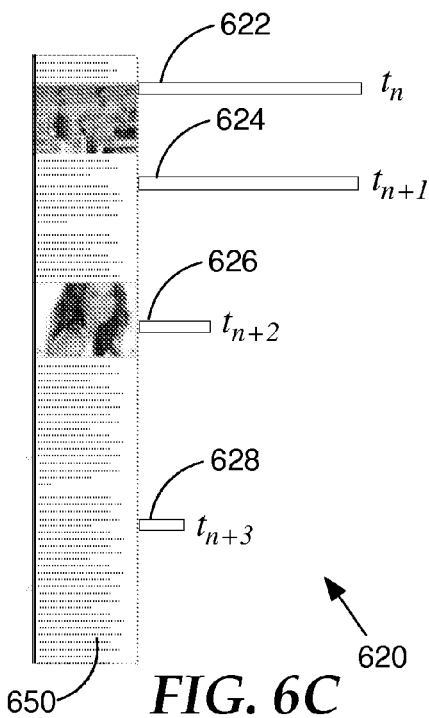

FIG. 6C illustrates scroll data 620. Scroll data 620 indicates that the user has viewed document 650 at display positions 622-628 in the order 622 at $t_n$, 624 at $t_{n+1}$, 626 at $t_{n+2}$ and 628 at $t_{n+3}$, where duration is represented by length in the visual representation of scroll data 620. It may be determined from scroll data 620 that an actionable event has occurred based on the detection of a speed increase scroll pattern in scroll data 620. The speed increase scroll pattern may indicate that the user is disengaged or becoming less engaged with document 650.

The detection of a speed increase scroll pattern may be based on a distribution of display positions 622-628, the duration the user views document 650 at display positions 622-628, and/or any other factor that may indicate that the content and document 650 is being consumed by a user who is disengaged or becoming less engaged. These factors may be compared with the user's historic user interaction data for other documents, as well as other users' historic user interaction data for the present document 650.

If it is determined that the user is becoming disengaged, more engaging content and/or engaging content recommendations may be provided as the additional content. The engaging content and/or engaging content recommendations may be determined based on information from a user-generated profile, data collected based on a user's viewing behavior, demographic information, general popularity, or any other data that may help determine content that is likely to engage the user.

Figure 6D:
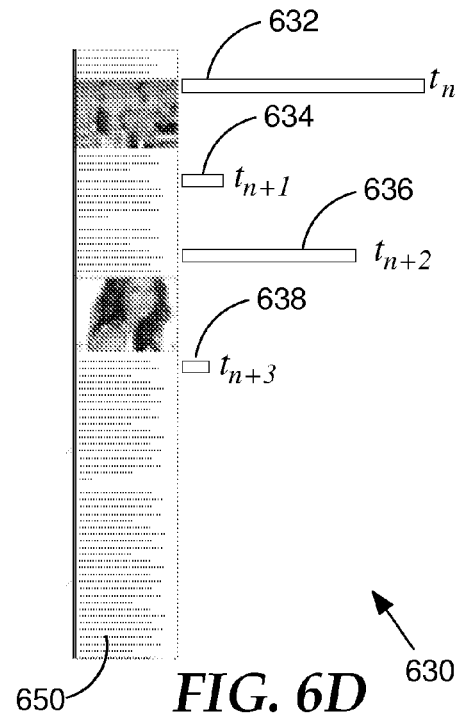

FIG. 6D illustrates scroll data 630. Scroll data 630 indicates that the user has viewed document 650 at display positions 632-638 in the order 632 at $t_n$, 634 at $t_{n+1}$, 636 at $t_{n+2}$ and 638 at $t_{n+3}$, where duration is represented by length in the visual representation of scroll data 630. Based on scroll data 630, the user has spent substantially more time viewing display positions associated with visual media. If it is determined that the user is interested in visual media, a slideshow, image library, video or other visual media may be displayed as the additional content.

4. Keyed Content

Figure 7:
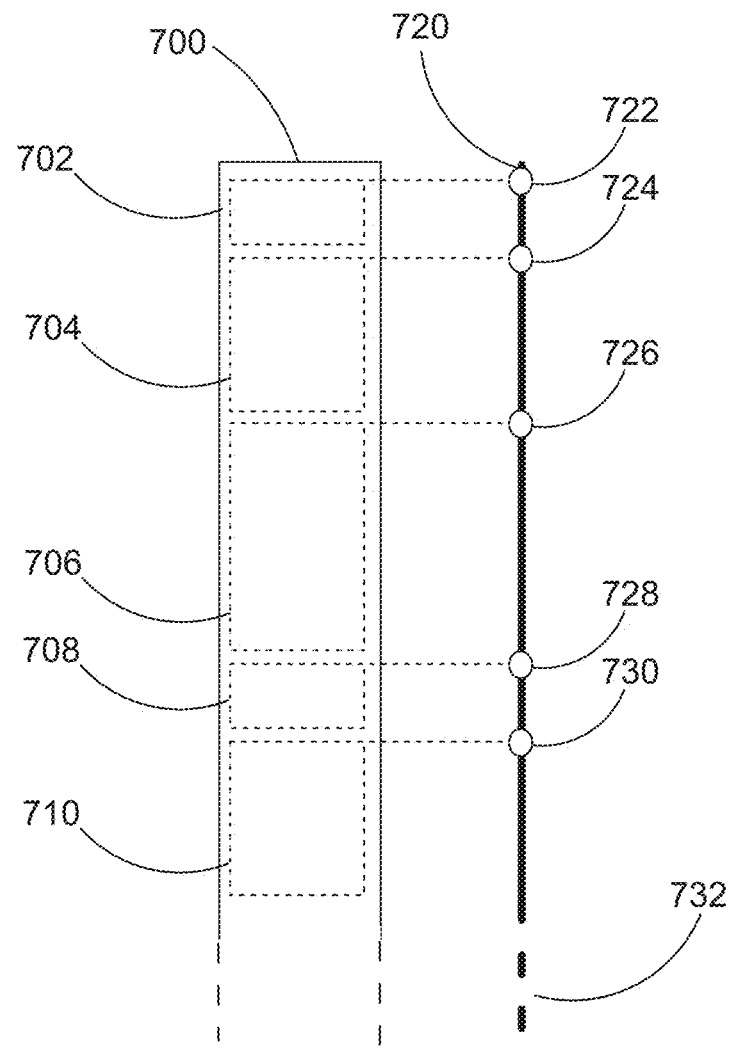
FIG. 7 illustrates an embodiment of a keyed document.

FIG. 7 illustrates an embodiment of a keyed document. Document 700 includes document objects 702-710. Document key data 720 includes a plurality of markers 722-730 corresponding to document objects 702-710. Markers 722-730 each indicate a position that a document object appears in document 700. For example, markers 722-730 may include data that identifies a specific document object and a specific position the specific document object appears in document 700. Markers 722-730 may also include data that identifies an order that the specific document object appears in document 700.

In one embodiment, document 700 is a streamed document, where document objects 702-710 are provided when the user has reached or is close to reaching the end of content that has been provided. The order and/or position of document objects 702-710 may be dynamic such that document 700 is appended at content insertion point 732. Content insertion point 732 may be at the end of document 700, the end of a frame or other container of document 700, or any other position within document 700. When the order and/or position of document objects 702-710 is dynamic, document key data 720 may be continuously updated as document objects 702-710 are selected and/or provided for viewing by the user.

5. Other User Interaction Data

Figure 8:
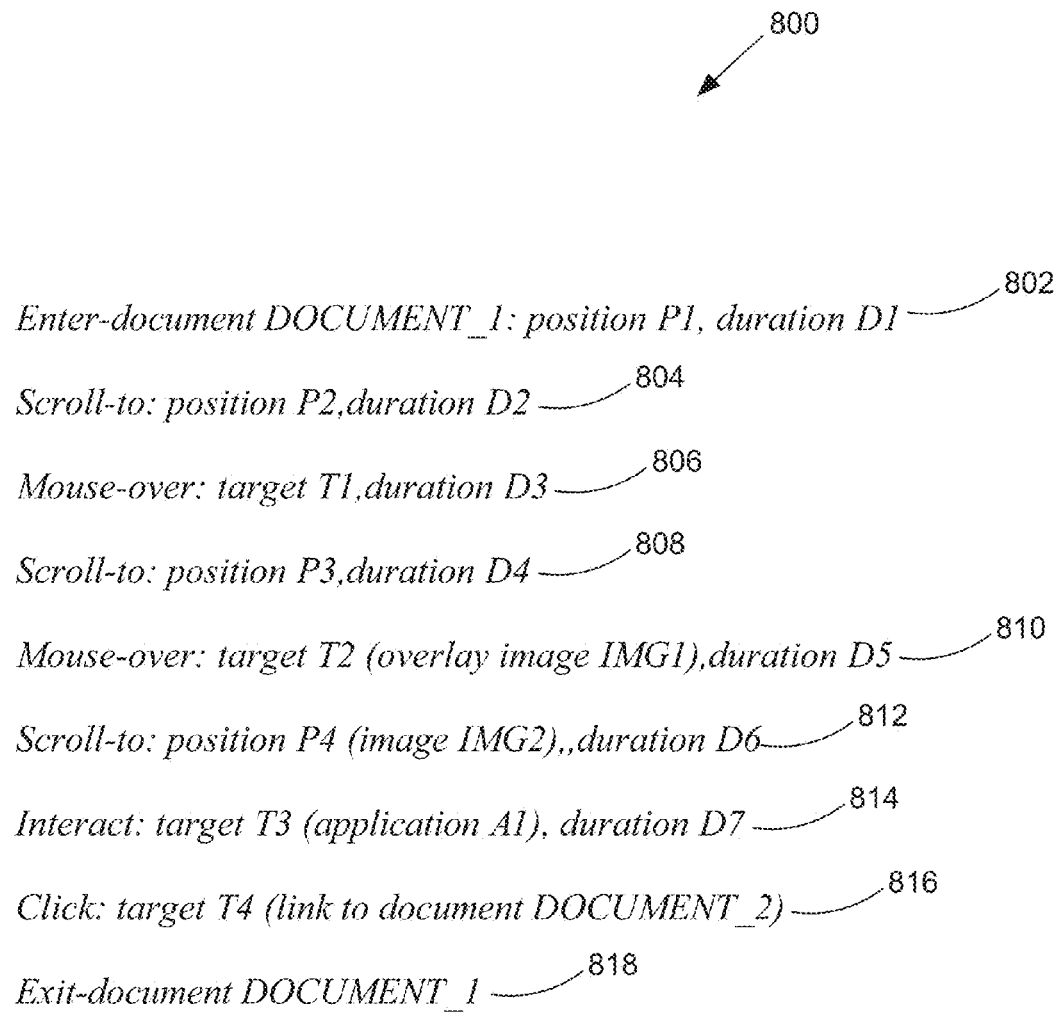
FIG. 8 illustrates an embodiment of user interaction data.

FIG. 8 illustrates an embodiment of user interaction data. User interaction data 800 includes data relating to a plurality of user interactions 802-818. User interactions other than scroll data may be used along with scroll data to select customized content for a user. User interactions 802-818 includes a representative, non-limiting set of example user interactions that may be used in selecting customized content for the user interacting with the document.

User interaction data 800 includes scroll data 804, 808 and 812, each of which indicates a position in DOCUMENT_1 and a duration. The position indicates a position of the document that is visible, such as the portion of the document that is displayed to the viewer in a display window. The position may indicate any data from which the visible portion of the document in the display window may be determined. The duration is representative of time data, which may include other time information other than duration. The scroll data may also include other user interaction data. For example, scroll data 812 includes data indicating that visual media IMG2 is visible in the display window at position P4 of DOCUMENT_1.

User interaction data 800 may also include entry data 802. Entry data 802 indicates that a user has started to view DOCUMENT_1. In one embodiment, entry interaction data 802 may include a position and a duration. Alternatively or in addition, the position and/or duration may be omitted or may have a default value. In one embodiment, entry data 802 is treated as scroll data. Alternatively or in addition, scroll data relating to the user's entry into DOCUMENT_1 may be recorded.

User interaction data 800 may also include exit data 818. Exit data 818 indicates that DOCUMENT_1 is no longer being displayed to a user. For example, the user may switch from the application, window, and/or program. The user may also turn off the device, or the device may otherwise enter an inactive mode. In one embodiment, exit data 818 is treated as scroll data. Alternatively or in addition, scroll data relating to the user's exit from DOCUMENT_1 may be recorded.

User interaction data 800 may also include pointer position data 806 and 810. Pointer position data 806 and 810 indicate a user's attention within the portion of the document that is viewable in the display window. In one embodiment, additional information may be included in pointer position data. For example, pointer position data 810 indicates that the user moved a pointing device over target T2, causing the display of overlay image IMG1.

User interaction data 800 may also include object interaction data 814. Object interaction data indicates that a user has interacted with an interactive object within the document. For example, object interaction data 814 indicates that the user has interacted with an application, such as a web object within DOCUMENT_1, for a specific duration. In one embodiment, pointer position data 810 may be considered object interaction data.

User interaction data 800 may also include pointer action data 816. Pointer action data 816 indicates that a user has used a selecting function of a user interface device. For example, pointer action data 816 indicates that the user has clicked target T4 to activate a link to DOCUMENT_2.

6. Content Analysis Data

Figure 9:
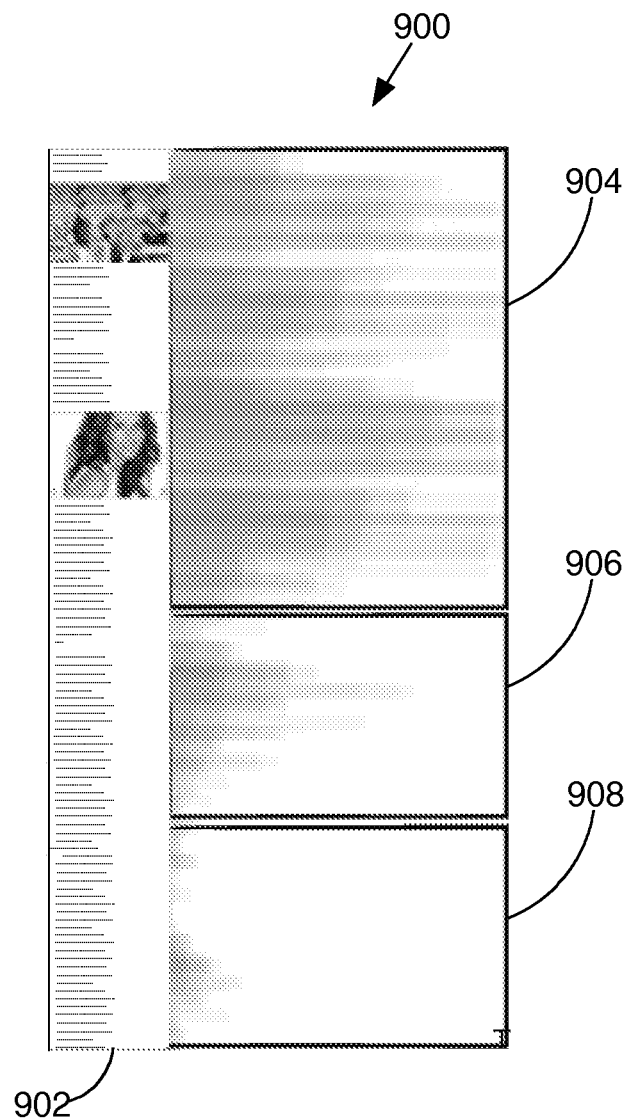
FIG. 9 illustrates an embodiment of content analysis data generated based on user interaction data from a plurality of users.

FIG. 9 illustrates an embodiment of content analysis data generated based on user interaction data from a plurality of users. Content analysis data 900 includes analysis data generated based on user interaction data from a plurality of users viewing document 902. In one embodiment, content analysis data 900 includes a plurality of metrics and/or thresholds generated based on a statistical analysis of user interaction data from a plurality of users. Content analysis data 900 may be updated as new users view document 902.

In document 900, first data 904 collected from a first region of document 902 indicates that users have historically had a high level of engagement in the first region of document 902. Second data 906 collected from a second region of document 902 indicates that users have historically had a low level of engagement in the second region of document 902. The data 908 collected from a third region a document 902 indicates that users have consistently disengaged in the third region of document 902.

Previously collected content analysis data 900 for multiple users may be used to determine the occurrence of an actionable event as a current user views document 902. Content analysis data 900 may also be used to evaluate content and to improve content. For example, content analysis data 900 may be used to configure the position and/or order of a plurality of document objects within a document.

When the position and/or order of document objects is dynamically generated in a document, it may be assumed that content analysis data for each individual document object is independent. In this case, content analysis data for each individual document object may be appended, such as for the purpose of determining the occurrence of an actionable event. Alternatively or in addition, it may be assumed that user interaction with the modified document will change when the position and/or order of document objects is changed.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
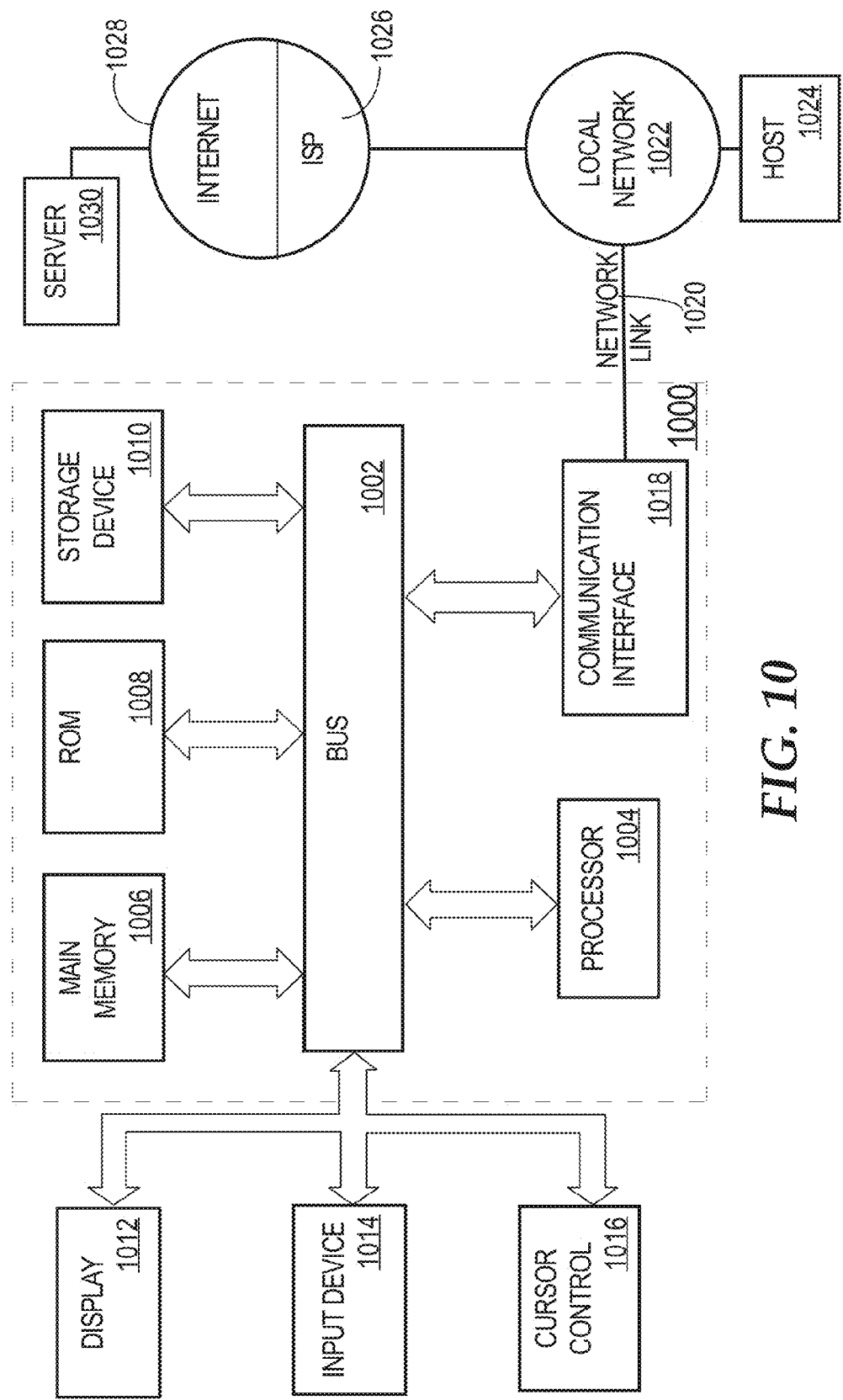
FIG. 10 illustrates a computer system upon which one or more embodiments may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    causing first content to be displayed on a client computing device in a scrolling interface configured to display a portion of the first content to a user based on a current display position, wherein the scrolling interface is configured to change the current display position based on input from the user;
    obtaining user interaction data comprising a plurality of display positions within the first content and corresponding time information for the plurality of display positions;
    detecting, in the user interaction data, a particular scroll pattern from among a plurality of scroll patterns, wherein each scroll pattern in the plurality of scroll patterns indicates a different state of mind of the user;
    in response to detecting the particular scroll pattern, dynamically selecting second content based on the particular scroll pattern;
    causing the second content to be displayed on the client computing device;
    wherein the method is performed by one or more computing devices.

2. The method of claim 1, wherein the first content comprises a content stream, and wherein the second content is displayed on the client computing device by inserting the second content into the content stream based on a current display position.

3. The method of claim 1, wherein the method further comprises the steps of:
    obtaining content analysis data that is generated based on multi-user interaction data from a plurality of users viewing the first content;
    wherein detecting the particular scroll pattern in the user interaction data is further based on the content analysis data.

4. The method of claim 1, wherein the particular scroll pattern is a random scroll pattern that indicates that the user may be searching the first content.

5. The method of claim 4, wherein the second content comprises a search interface for searching the first content.

6. The method of claim 1, wherein the particular scroll pattern is an even scroll pattern with respect to time that indicates that the user may be engaged.

7. The method of claim 6, wherein the second content comprises an advertisement.

8. The method of claim 1, wherein the particular scroll pattern is a speed increase scroll pattern that indicates that the user may be disengaged.

9. The method of claim 8, wherein the second content comprises at least one recommendation.

10. The method of claim 1, wherein the particular scroll pattern is a media viewing scroll pattern that indicates that the user may be interested in visual media.

11. The method of claim 10, wherein the second content comprises visual media selected from at least one image, an image library, a slideshow, or at least one video.

12. The method of claim 1, wherein the method is performed by the client computing device.

13. One or more non-transitory storage media storing instructions which, when executed by one or more processors, cause performance of:
    causing a document to be displayed on a client computing device;
    obtaining user interaction data comprising a plurality of display positions within the document and corresponding time information for the plurality of display positions;
    detecting, in the user interaction data, a particular scroll pattern from among a plurality of scroll patterns, wherein each scroll pattern in the plurality of scroll patterns indicates a different state of mind of the user;
    in response to detecting the particular scroll pattern, dynamically selecting customized content based on the particular scroll pattern;
    causing the customized content to be displayed on the client computing device.

14. The non-transitory storage media of claim 13, wherein the particular scroll pattern is determined based on content analysis data comprising multi-user interaction data collected from a plurality of users viewing the document.

15. The non-transitory storage media of claim 13,
    wherein the particular scroll pattern comprises a random scroll pattern that indicates that the user may be searching the first content;
    wherein the customized content comprises a search interface for searching the first content.

16. The non-transitory storage media of claim 13,
    wherein the particular scroll pattern comprises an even scroll pattern with respect to time that indicates that the user may be engaged;

wherein the customized content comprises an advertisement.

17. The non-transitory storage media of claim 13, wherein the one or more computing devices is selected from the client computing device and at least one server device.

18. A content selection system comprising:
   one or more processors;
   one or more computer-readable media storing one or more computer programs for execution by the one or more processors, the one or more computer programs comprising instructions for:
   causing first content to be displayed on a client computing device;
   obtaining user interaction data comprising a plurality of display positions within the first content and corresponding time information for the plurality of display positions;
   detecting, in the user interaction data, a particular scroll pattern from among a plurality of scroll patterns, wherein each scroll pattern in the plurality of scroll patterns indicates a different state of mind of the user;
   in response to detecting the particular scroll pattern, dynamically selecting second content based on the particular scroll pattern;
   causing the second content to be displayed on the client computing device.

19. The non-transitory storage media of claim 13,
   wherein the particular scroll pattern comprises a speed increase scroll pattern that indicates that the user may be disengaged;
   wherein the customized content comprises at least one recommendation.

20. The non-transitory storage media of claim 13,
   wherein the particular scroll pattern comprises a media viewing scroll pattern that indicates that the user may be interested in visual media;
   wherein the customized content comprises visual media selected from at least one image, an image library, a slide show, or at least one video.

* * * * *